United States Patent
Yaroslavskiy et al.

(10) Patent No.: US 9,129,004 B2
(45) Date of Patent: Sep. 8, 2015

(54) MULTI-INTERVAL QUICKSORT ALGORITHM FOR COMPLEX OBJECTS

(75) Inventors: Vladimir Yaroslavskiy, Saint-Petersburg (RU); Elena Ivanova, Saint-Petersburg (RU); Vitaly Bychkov, Saint-Petersburg (RU)

(73) Assignee: ORACLE AMERICA, INC., Redwood City, CA (US)

( * ) Notice: Subject to any disclaimer, the term of this patent is extended or adjusted under 35 U.S.C. 154(b) by 845 days.

(21) Appl. No.: 12/269,170

(22) Filed: Nov. 12, 2008

(65) Prior Publication Data
US 2010/0121848 A1    May 13, 2010

(51) Int. Cl.
*G06F 17/30* (2006.01)

(52) U.S. Cl.
CPC ............... *G06F 17/30607* (2013.01)

(58) Field of Classification Search
CPC ............. G06F 17/30395; G06F 17/30985; G06F 17/30607
USPC ........... 707/752, 703, 736, 737, 753, 999.007
See application file for complete search history.

(56) References Cited

U.S. PATENT DOCUMENTS

| | | | |
|---|---|---|---|
| 7,496,572 B2 * | 2/2009 | Blaicher | 1/1 |
| 2004/0098390 A1 * | 5/2004 | Bayliss et al. | 707/7 |
| 2007/0088699 A1 * | 4/2007 | Edmondson | 707/7 |

OTHER PUBLICATIONS

Author: James Edmondson; Title: M Pivot Sort—Replacing Quick Sort; Tile date: Published on 2005; web link: www.jedmondson.net/downloads/mpivotsort_cameraready.doc; pp. 1-7.*

* cited by examiner

*Primary Examiner* — MD. I Uddin
(74) *Attorney, Agent, or Firm* — Marsh Fischmann & Breyfogle LLP; Kent A. Lembke

(57) ABSTRACT

Systems and methods ("utility") for sorting a plurality of complex objects are provided herein. The utility may include a sorting algorithm that sorts references to the complex objects, rather than the complex objects themselves, such that the need to copy and swap complex objects in their locations in memory is reduced. Further, the sorting algorithm may utilize a recursive divide and conquer process, using multiple pivot elements at each sorting level. For example, the sorting algorithm is based on a modified Quicksort algorithm that uses multiple pivot elements at each level to sort an array of references that point to complex objects.

22 Claims, 5 Drawing Sheets

US 9,129,004 B2

MULTI-INTERVAL QUICKSORT ALGORITHM FOR COMPLEX OBJECTS

BACKGROUND OF THE INVENTION

1. Field of the Invention

The present invention relates generally to improved systems and methods for sorting data. More particularly, the present invention relates to systems and methods for sorting data objects, wherein references to the objects are sorted rather than the objects themselves to reduce the time required for copying and swapping data during the sorting process. Further, a divide-and-conquer sorting method that includes multiple pivot elements is provided.

2. Relevant Background

Perhaps one of the most fundamental tasks to the operation of computers is sorting, i.e., the process of arranging a set of similar information into a desired order. While employed in virtually all database programs, sorting routines or algorithms are also extensively used in many other areas. Common examples include compilers, interpreters, and operating system software. In many instances, the quality and performance of such software is determined by the efficiency of its sorting techniques. Since sorting methodology often plays such an important role in the operation of computers and other data processing systems, there has been a great deal of interest in seeking ways to improve existing systems and methods.

To analyze a sorting algorithm, the amount of resources (such as time and storage) necessary to execute it is examined. Most algorithms are designed to work with inputs of arbitrary length. Usually the efficiency or complexity of a sorting algorithm is stated as a function relating the input length to the number of steps (time complexity) or storage locations (space complexity). Generally, sorting algorithm analysis is an important part of a broader computational complexity theory, which provides theoretical estimates for the resources needed by any algorithm, which solves a given computational problem. These estimates provide an insight into reasonable directions of research for efficient algorithms.

In theoretical analysis of algorithms, it is common to estimate their complexity in an asymptotic sense, i.e., to estimate the complexity function for reasonably large length of input. The notation for this analysis is generally referred to as "Big O notation." For instance, a binary search is said to run an amount of steps proportional to a logarithm, or in O(log(n)), colloquially "in logarithmic time." Usually asymptotic estimates are used because different implementations of the same algorithm may differ to a degree in efficiency. However the efficiencies of any two "reasonable" implementations of a given algorithm are related by a constant multiplicative factor called a hidden constant.

Exact (not asymptotic) measures of efficiency can sometimes be computed, but they usually require certain assumptions concerning the particular implementation of the algorithm, called model of computation. A model of computation may be defined in terms of an abstract computer, e.g., a Turing machine, and/or by postulating that certain operations are executed in a unit time. For example, if the sorted set to which we apply a binary search has N elements, and we can guarantee that a single binary lookup can be done in a unit time, then at most $\log_2 N+1$ time units are needed to return an answer.

Exact measures of efficiency are useful to programmers who actually implement and use algorithms, because they are more precise and thus enable them to know how much time they can expect to spend in execution. To these programmers, a hidden constant can make all the difference between success and failure for their application.

Informally, a sorting algorithm can be said to exhibit a growth rate on the order of a mathematical function if beyond a certain input size n, the function f(n) times a positive constant provides an upper bound or limit for the run-time of that algorithm. In other words, for a given input size n greater than some no and a constant c, an algorithm can run no slower than c*f(n). This concept is frequently expressed using Big O notation. For example, if the run-time of a sorting algorithm grows quadratically as its input size increases, the sorting algorithm can be said to be of order $O(n^2)$.

In addition to the number of operations required for a particular sorting algorithm, another factor that can significantly increase the time required to sort a set of data is the amount of data that needs to be copied (or swapped) to different memory locations during the sorting algorithm. As can be appreciated, when data that is relatively large (i.e., complex) is sorted using an algorithm that involves a large number of copying and swapping, the time requirements can be overly burdensome. As used herein, a "complex object" is generally any grouping of data or object that requires more than a trivial amount of memory to store the data (e.g., requires more than the amount of data required to store an integer). Thus, sorting algorithms that involve a large number of copying and swapping of the data to be sorted will take longer to execute when sorting complex objects than when sorting "simple objects," such as integers. The time difference will generally depend on the actual size of the complex objects to be sorted.

Therefore, there remains a need for systems and methods that facilitate the efficient sorting of complex data objects. Preferably, such systems and methods would provide a sorting algorithm that is capable of sorting the complex objects faster than previously known systems and methods.

SUMMARY OF THE INVENTION

The present invention addresses the above problems by providing methods and systems for quickly and efficiently sorting complex objects. Such methods and systems are achieved by using a "divide and conquer" sorting algorithm, which reduces the number of operations needed to sort complex objects. To further increase the speed of the sorting algorithm, the sorting algorithm operates on references to the complex objects, rather than the complex objects themselves. Generally, a reference is an object containing information which refers to data stored elsewhere, as opposed to containing the data itself. For example, pointers are one type of reference, storing only the address of an object in a computer system's memory. Further, the sorting algorithms of the present invention use at least two pivot elements at each level of a recursive algorithm, thereby further increasing the efficiency of the sorting operation.

According to a first aspect of the present invention, a computer implemented method for sorting an array of elements is provided. The method includes receiving a sort request from a requesting entity that includes sorting criteria for the array of elements, wherein the elements are stored in memory that is accessible by the processor, and wherein the elements are references to complex objects stored in memory. The method further includes operating a processor to run a sorting module. Running the sorting includes selecting at least two of the elements as pivot elements, and sorting the elements in the array using the at least two pivot elements to form a sorted array. Further, the elements are sorted dependent on the sorting criteria, the sorting criteria including a characteristic of the complex objects. The method also includes storing the sorted array of elements in a memory.

According to a second aspect of the present invention, a computer-readable storage medium having stored therein a computer program comprising computer code is provided. The code, when executed on a computer, is operable to access a source array of elements, wherein each of the elements is a reference to one of a plurality of complex objects. The code is also operable to select at least two of the elements as pivot elements, and compare a characteristic of each of the complex objects that correspond to each of the pivot elements with each other to determine a sort order for the pivot elements relative to each other. Further, the code is operable to create a plurality of empty sub-arrays that each correspond to a sorting interval relative to the pivot elements, such that the number of sub-arrays created is one more than the number of pivot elements, and to determine the relative sorting position of each of the non-pivot elements in the array with respect to the pivot elements by comparing the characteristic of the corresponding complex object for each of the non-pivot elements. Additionally, dependent upon the determination, the code is operable to add each non-pivot element of the array into a corresponding one of the plurality of sub-arrays; and recursively perform the select, compare, create, determine, and add steps for each of the plurality of sub-arrays until all of the elements of the source array are in a sorted order.

According to a third aspect of the present invention, a computer system for sorting a source array that includes a plurality elements is provided. The computer system includes a sorting algorithm module that is stored in memory of the computer system, the sorting algorithm module being operable to convert an unsorted array of elements into a sorted array of elements. The computer system also includes a plurality of complex objects stored in memory of the computer system, and an array of elements stored in memory of the computer system, wherein the each of the elements includes a reference to one of the plurality of complex objects. Further, the computer system includes a processor that is operative to execute the sorting algorithm module; and memory that is operable to store the sorted array of elements.

The sorting algorithm module is operable to sort the array of elements according to sorting criteria, and includes selecting at least two of the elements as pivot elements, and sorting the elements in the array using the at least two pivot elements to form a sorted array, wherein the elements are sorted dependent on the sorting criteria, the sorting criteria including a characteristic of the complex objects.

Various features and refinements to the above-noted embodiments are also provided. For example, the sorting algorithm also includes comparing the pivot elements with each other to determine a sort order for the pivot elements relative to each other, creating a plurality of empty sub-arrays that each correspond to a sorting interval relative to the pivot elements, such that the number of sub-arrays created is one more than the number of pivots, determining the relative sorting position of each of the non-pivot elements in the array with respect to the pivot elements, and dependent upon the determining, inserting each non-pivot element of the array into a corresponding one of the plurality of sub-arrays. Additionally, the sorting algorithm may include recursively performing the selecting, comparing, creating, determining, and inserting steps for each of the plurality of sub-arrays until all of the elements are in a sorted order.

Further, the number of pivot elements used in the sorting algorithms may be two, three, or more, such as ten or greater. Further, the complex objects that are to be sorted may be objects of a database, and may have an average size of greater than about 1 kilobyte each. Additionally, the pivot elements for each array and sub-array may be chosen in any suitable way (e.g., the first K elements, the last K elements, K random elements, or the like). The above-noted embodiments may also include interfaces for permitting a computer system to provide sorted complex objects to a requesting entity, such as one or more users and/or one or more other computer systems that requests one or more of the complex objects.

In addition to the exemplary aspects and embodiments described above, further aspects and embodiments will become apparent by reference to the drawings and by study of the following descriptions.

DETAILED DESCRIPTION OF THE PREFERRED EMBODIMENTS

Embodiments of the present invention are directed to methods and systems for quickly and efficiently sorting data, such as complex objects, using a modified Quicksort algorithm. Such methods and systems are achieved by using a "divide and conquer" sorting algorithm, which reduces the number of operations needed to sort the complex objects. To further increase the speed of the sorting algorithm, the sorting algorithm operates on references that point to the complex objects, rather than the complex objects themselves. Further, the sorting algorithms of the present invention use at least two pivot elements at each level of a recursive algorithm, thereby further increasing the efficiency of the sorting operation. Various features and embodiments of the present invention are described in detail below with reference to FIGS. 1-5.

Figure 1:
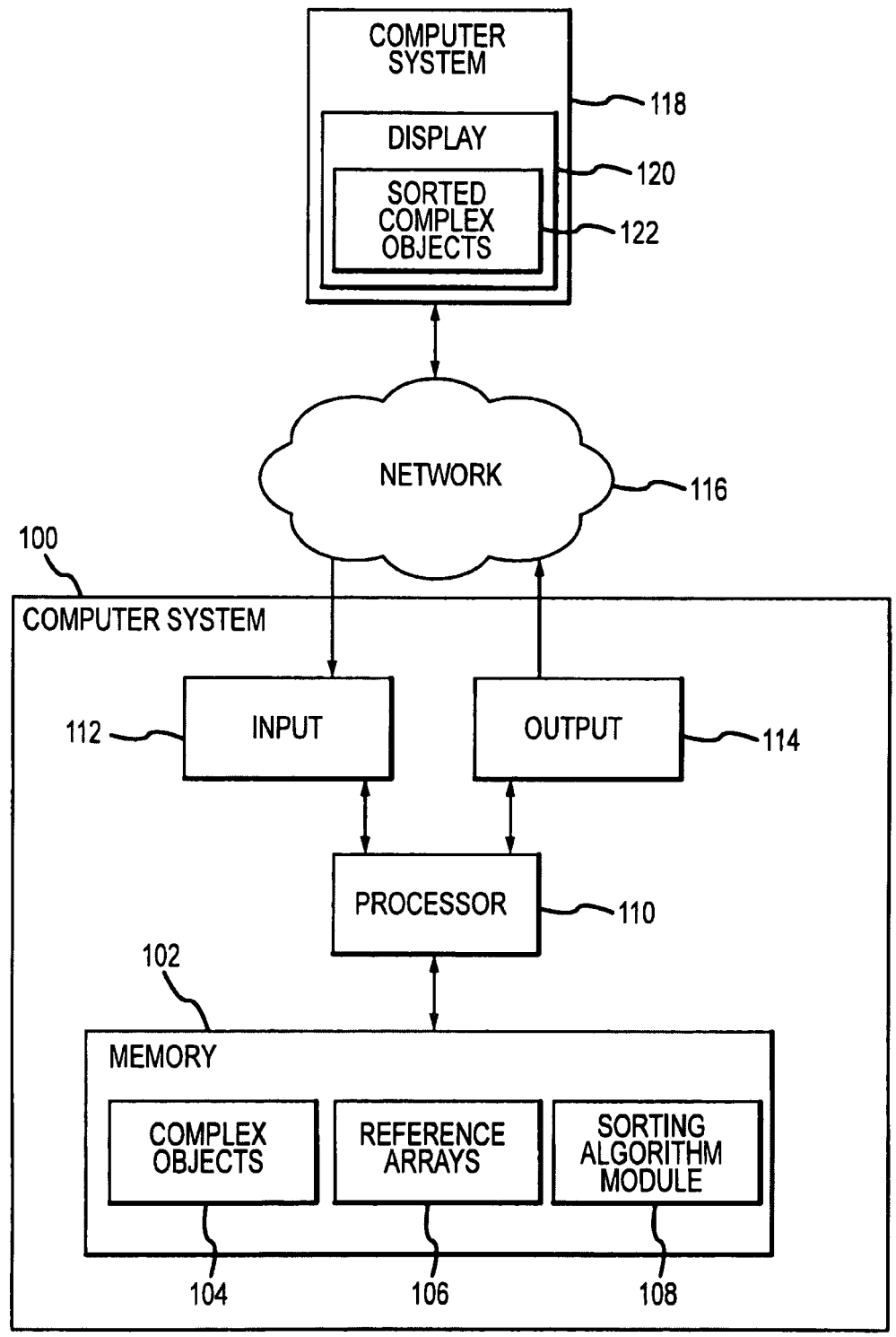
FIG. 1 illustrates a block diagram of a computer system that includes a sorting algorithm module that is operative to sort a plurality of complex objects.

FIG. 1 illustrates a block diagram of a computer system 100 that includes a sorting algorithm module 108 that is operative to sort a plurality of complex objects 104. The complex objects 104 may include any type of data, such as personal information, merchandise information, event information, or any other type of data that may require more than a trivial amount of storage space (e.g., more than the amount of storage required to store an integer). Generally, the complex objects may include any grouping of data that is larger than individual references (e.g., pointers) that may point to them, so that it is generally faster to copy and swap the references to the objects rather than the complex objects themselves.

The computer system 100 may include memory 102 that stores the complex objects 104 (e.g., in a database) and the sorting algorithm module 108. Further the memory 102 may store reference arrays 106 that include references (e.g., pointers) to the addresses of complicated objects. As can be appreciated, the memory 102 may include any of the various types of memory used in computer systems, including one or more disk drives, DRAM memory, non-volatile memory (e.g., flash memory), other types of memory, or any combination thereof. The computer system 100 may also include a processor 110 that is communicatively coupled to the memory 102, such that the processor 110 may execute the sorting algorithm 108 and access the reference arrays 106 and complex objects 104.

The computer system 100 may also include an input interface module 112 and an output interface module 114. These modules 112 and 114 may be used to allow the computer system 100 to interface with other entities, such as users or other computer systems (e.g., a user computer system 118). As an example, the modules 112 and 114 may include networking modules for permitting a user that is remote from the computer system 100 to select a set of complex objects 104 and a sorting order, and for providing the sorted complex objects 122 to the user to be viewed on the users own computer system 118.

In operation, the complex objects 104 may each relate to a particular movie and include information about that movie (e.g., show times, ratings, length of the movie, theaters where the movie is showing, and the like). A user, located remotely, may send a request for a listing of available movies that are sorted in a particular order. For example, the request may be for all movies at a particular theatre, sorted by their start times for a particular day. To achieve this, the user's computer system 118 and the computer system 100 may be communicatively coupled to each other through a network 116. The network 116 may be any suitable kind, including wired and/or wireless, and may include any combination of standard or proprietary protocols. As an example, the network 116 may include the Internet. The computer system 100 may be operable to receive the user's request, and to provide the requested data to the user in a sorted order.

Since the computer system 100 allows multiple users to access its information, it would not be desirable for an individual user's request to alter the structure of the complex objects 104. Thus, in response to a user's request the computer system 100 may then sort an array of references to the specified complex objects 104 (e.g., the particular movies), rather than the complex objects 104 themselves. In this regard, multiple users may request and receive the data in a sorted order that is tailored to their request. The computer system 100 may then send the copies of the requested sorted complex objects 122 to the user through the output interface module 114, wherein the user may view them on a display 120 of the computer system 118. As an example, the user may utilize a web application running on the computer system 118 to interface with the computer system 100. In this regard, multiple users may access the computer system 100 and request different sets of complex objects 104 that are sorted according to different sorting criteria. Additionally, the interface modules 112 and 114 could include keyboards, mice, displays, printers, wired or wireless interfaces, or any other desirable interfaces.

Figure 2:
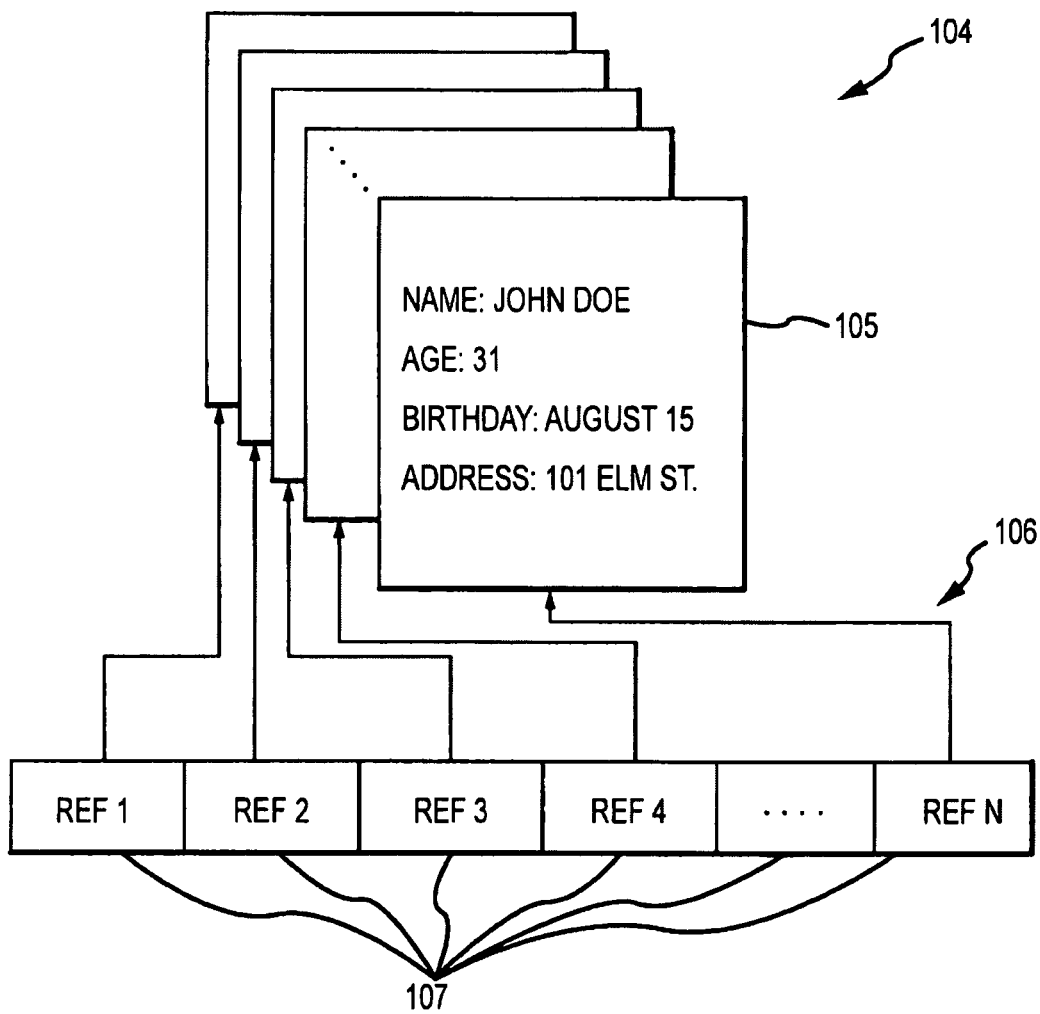
FIG. 2 illustrates a plurality of complex objects and an array that includes a plurality of references that point to the complex objects.

FIG. 2 illustrates one example of a plurality of complex objects 104 and an array 106 that includes a plurality of references (i.e., Ref 1, Ref 2, . . . , Ref N) to the complex objects. As shown, the complex objects 104 each include personal data 105 for an individual (i.e., name, age, birthday, and address). As such, each of the complex objects 104 may occupy a significant portion of memory, such that implementing a sorting algorithm that requires copying and swapping the positions of each object would be a very time consuming task. To remedy this problem, the reference array 106 is provided, and includes elements that are references (or pointers) to the locations in memory 102 of the complex objects 104. In this regard, the sorting algorithms 108 of the present invention may simply move or swap the references, which occupy a small amount of memory (e.g., several bytes or less), rather than the relatively large complex objects 104, thereby reducing the time spent copying and swapping data between memory locations.

Figure 3A:
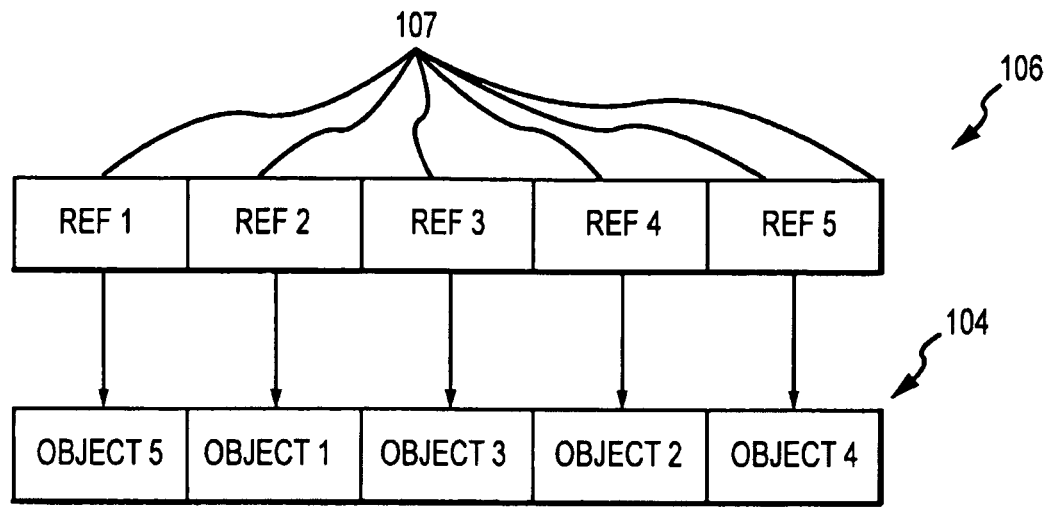
FIG. 3A illustrates an unsorted array of references that point to a plurality of complex objects.
Figure 3B:
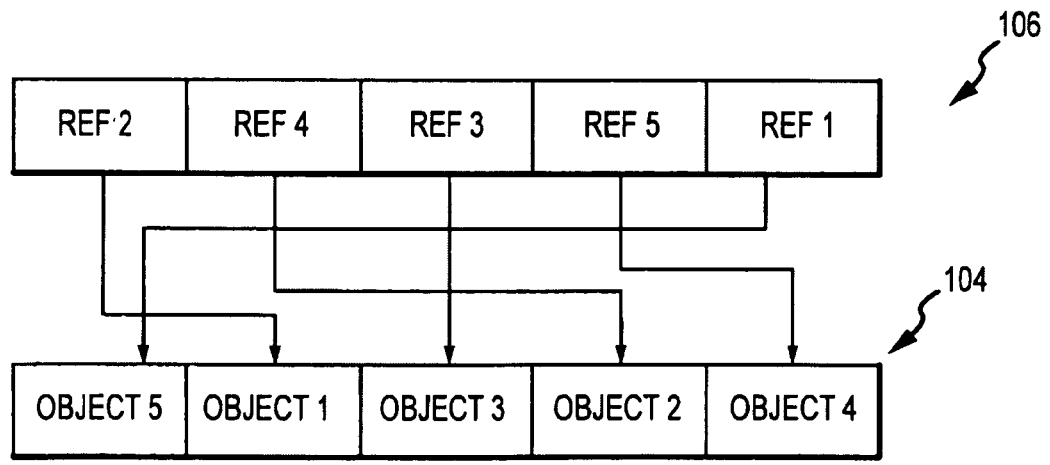
FIG. 3B illustrates a sorted array of references that point to a plurality of complex objects.

FIG. 3A illustrates an unsorted array 106 of references 107 that point to a plurality of complex objects 104. In this example, it is assumed that Object 1 should be the first object (left side) and Object 5 should be the last object (right side) according to the particular sorting criteria. As shown, the reference array 106 initially includes References 1, 2, 3, 4, and 5 that point to the unsorted Objects 5, 1, 3, 2, and 4, respectively. FIG. 3B illustrates the reference array 106 after a sorting algorithm of the present invention has sorted it. As shown, after the sorting algorithm has been executed, the Objects 1-5 remain in the positions in memory that they were in prior to the execution of the sorting algorithm. In this regard, the positions of the References 1-5 have been swapped with each other, such that the reference 107 that points to Object 1 (i.e., Reference 2) has been moved to the beginning of the reference array 106, and so on. That is, the reference array 106 has been sorted such that the references 107 are ordered according to the sorting criterion that was requested for the complex objects 104 that the references point to.

Figure 4:
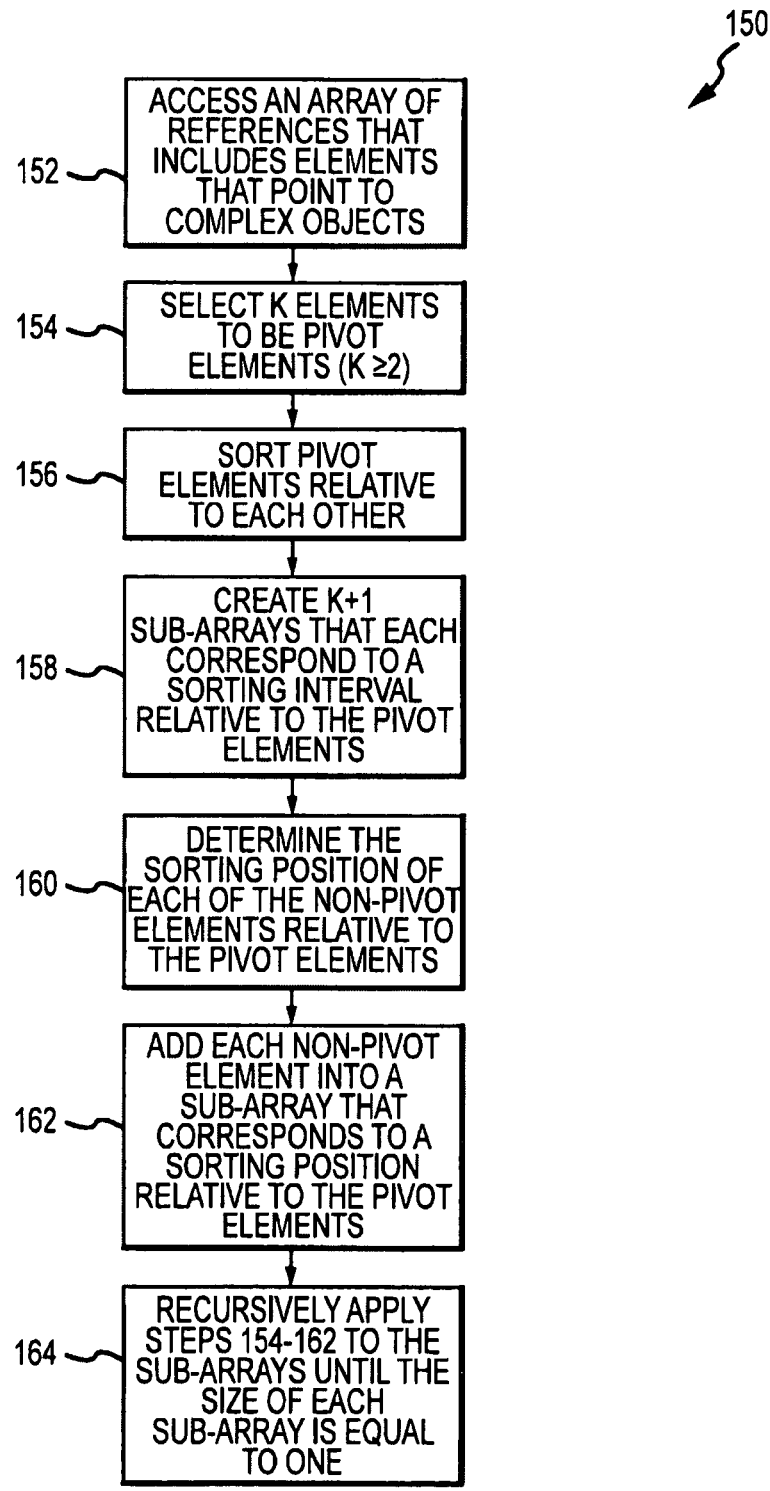
FIG. 4 illustrates a flowchart for a sorting algorithm according to one embodiment of the present invention.

FIG. 4 illustrates a flowchart for a sorting algorithm 150 according to one embodiment of the present invention. The sorting algorithm 150 begins at step 152 by accessing an unsorted array that includes elements that are references to complex objects. Next, the algorithm 150 designates K elements (K is greater than or equal to two) of the array as "pivot elements", step 154. The algorithm 150 may use any method to select which elements of the array are designated as pivot elements. For example, the algorithm 150 may select the first K elements of the array to be the pivot elements. Alternatively, the sorting algorithm 15 may randomly select K elements of the array to be the pivot elements. Those skilled in the art will readily recognize that other ways of selecting the pivot elements may be employed.

The next step in the sorting algorithm 150 provides for sorting the K pivot elements relative to each other according to a predetermined sorting criterion, step 156. Since the elements themselves are references to complex objects, the comparisons that take place when sorting the pivot elements are actually comparisons between a characteristic of the complex objects that are referenced by the elements of the array. For example, if the complex objects include the names of persons, and the sorting criterion specifies that the objects are to be sorted alphabetically by a person's last name, then a pivot element that references a complex object for a person with the last name of Johnson would come before the pivot element that referenced a complex object for a person with the last name of Smith, because the letter J comes before the letter S in the alphabet.

Next, K+1 empty sub-arrays (or lists) are created that each correspond to a sorting interval relative to the K pivot elements, step 158. For example, a sub-array is created for all the elements of the array that are less than or equal to the pivot element that has the smallest value, and another sub-array is created for the elements that are greater than or equal to the pivot element that has the largest value. Similarly, sub-arrays are created that represent the intervals between pivot elements. For the case where two pivots are used (K=2), a total of three sub-arrays are created. The first sub-array is for elements that are less than the smaller pivot element, the second sub-array is for elements that have a value that is between the smaller pivot element and the larger pivot element, and the third sub-array is for elements that have a value that is greater than the larger pivot element.

The sorting algorithm 150 then compares the other, non-pivot elements to the K pivot elements to determine into which of the sub-arrays to insert each of the non-pivot elements, steps 160 and 162. The result is that the K pivot elements are placed into their final sorted position in the array, with the K+1 sub-arrays positioned around the K pivot elements. See FIG. 5 for an illustration of the pivot elements and sub-arrays during the sorting process. Once the K pivot elements have been placed into their final position, steps 154 to 162 are applied recursively at step 164 to each of the K+1 sub-arrays until all of the elements are in a sorted order. It should be appreciated that the number of recursive operations may vary significantly depending on the number of elements to be sorted, the number of pivot elements used, the particular pivot elements that are selected, the degree to which the array was already sorted, and other factors.

Figure 5:
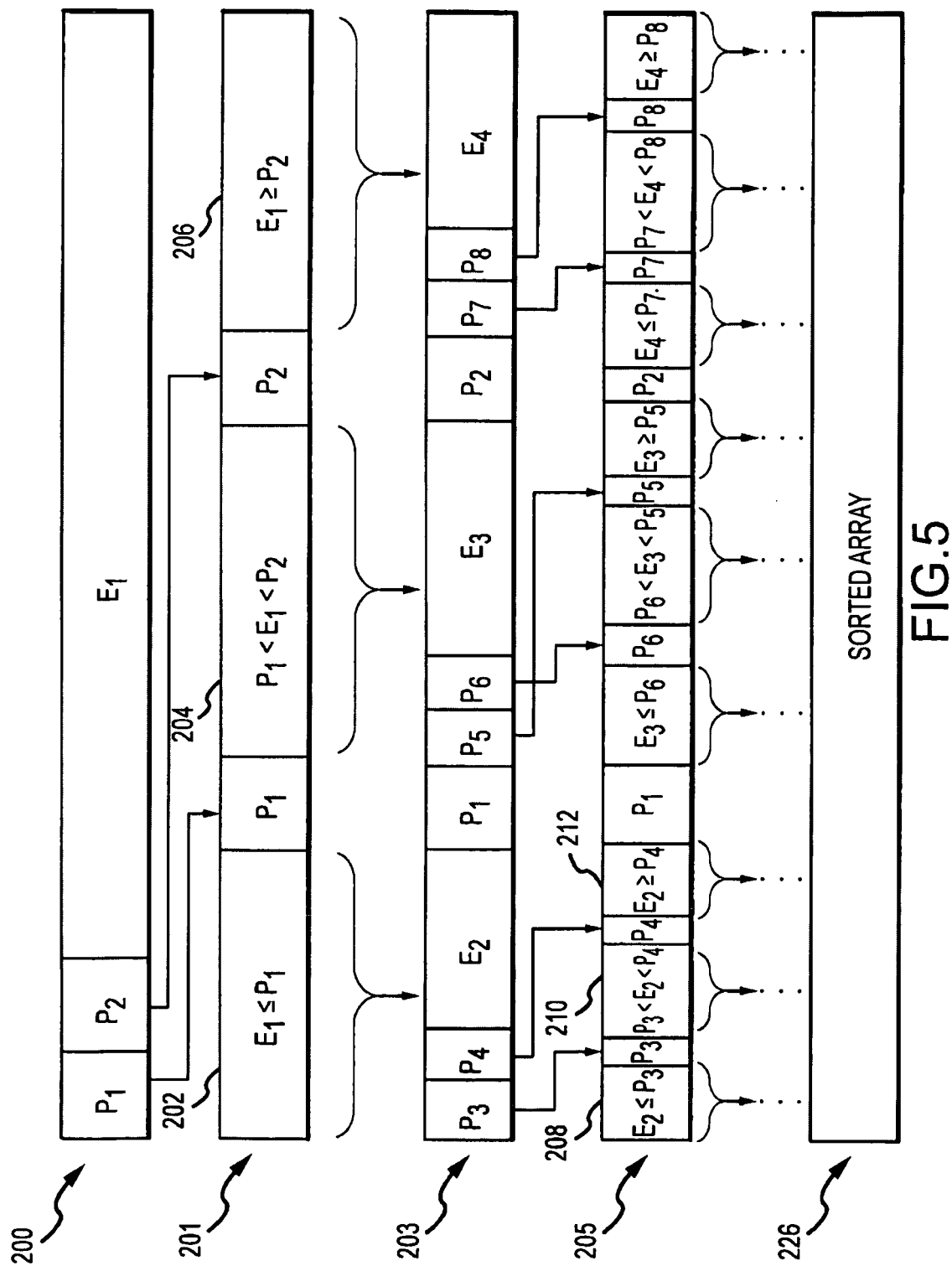
FIG. 5 illustrates one embodiment of the sorting algorithm applied to a source array of references.

FIG. 5 illustrates one embodiment of a sorting algorithm of the present inventions applied to a source array of references. As shown, an unsorted source array 200 is provided that includes a plurality of elements that are references that point to complex objects. In this example, the number of pivot elements used is two (i.e., K=2), and the first two elements of the source array 200 are selected as pivot elements $P_1$ and $P_2$, with all other elements in the source array 200 having the designation $E_1$.

As discussed above, the pivot elements $P_1$ and $P_2$ may generally be chosen in any way. For example, the first two elements, the last two elements, the middle two elements, or two random elements may be chosen as the pivot elements $P_1$ and $P_2$. Additionally, more sophisticated methods may be used to select the pivot elements. For example, to improve the sorting algorithm's efficiency, it may be desirable to select $P_1$ and $P_2$ such that sub-arrays of substantially the same size are created. Thus, the algorithm may use information known about the data to choose pivot elements that will produce sub-arrays of relatively the same size.

As described above in reference to step 156 shown in FIG. 4, the pivot elements $P_1$ and $P_2$ are first compared with each other to determine their respective sort order. In this example, the complex object pointed to by $P_1$ is less than the complex object pointed to by $P_2$, so $P_1$ is placed before $P_2$ in an intermediate array 201, that includes three sub-arrays 202, 204, and 206 that are created so that the other non-pivot elements $E_1$ of the source array may be inserted into one of them. It is noted that the intermediate array 201 may occupy the same physical memory space as the source array 200, but is referred to herein separately for explanatory purposes. As shown, the sub-array 202 contains the elements $E_1$ that are less than or equal to the pivot element $P_1$. The sub-array 204 contains the elements $E_1$ that are greater than $P_1$ and less than $P_2$. Similarly, the sub-array 206 contains the elements $E_1$ that are greater than $P_2$. As can be appreciated, after all of the non-pivot elements $E_1$ have been inserted into one of the sub-arrays 202, 204, and 206, the pivot elements $P_1$ and $P_2$ will be located in their final sorted position in the intermediate array 201.

After the non-pivot elements $E_1$ have been positioned in the intermediate array 201, the operations applied to the source array 200 are then repeated recursively on each sub-array 202, 204, and 206, leaving the pivot elements $P_1$ and $P_2$ in their respective positions. For example, as shown in an intermediate array 203, the first two elements of the sub-array 202 are designated as pivot elements $P_3$ and $P_4$. Then, the pivot elements $P_3$ and $P_4$ are compared, and three sub-arrays 208, 210, and 212 are created for insertion of the non-pivot elements $E_2$ of the sub-array 202.

Similar operations are performed for the sub-arrays 204 and 206, wherein the pivot elements $P_5$ and $P_6$, and pivot elements $P_7$ and $P_8$, respectively, are used. As shown in the intermediate array 205, the pivot elements $P_1$-$P_8$ are positioned in their final sort positions, with the remaining non-pivot elements $E_2$, $E_3$, and $E_4$ positioned in sub-arrays (e.g., sub-arrays 208, 210, and 212) that are located at sorted intervals with respect to the pivot elements $P_1$-$P_8$. This process continues recursively until all elements have been sorted, resulting in the sorted array 226.

It should be appreciated that the features of the sorting algorithms of the present invention offer several advantages. First, by copying and swapping references to complex objects rather than the objects themselves, considerable time is saved. Second, using multiple pivot elements (instead of a single pivot element) to sort each array and sub-array recursively also increases the speed of the sorting algorithms. This efficiency improvement is demonstrated by the mathematical proofs below that illustrate the advantage of using two or more pivot elements rather than a single pivot element.

Initially, sorting an array of n elements may be thought of as selecting one permutation of the n elements among all possible permutations. The number of possible permutations of n elements is the factorial of n (n!), so the task for any sorting algorithm is to determine the one permutation out of n! possibilities. In Big-O notation, the minimum number of operations for sorting n element using a sorting algorithm such as those described herein is O(ln(n!)). Using the approximations provided by Stirling's formula for large factorials, the minimum number of operations can be approximated as O(A*n*ln(n)+B), where A and B are constant coefficients that vary dependent upon a particular implementation of a sorting algorithm, and n is the number of elements to be sorted. Note that when n is large (e.g., one thousand, ten thousand, or greater), the B coefficient may be ignored because will be extremely small relative to the A*n*ln(n) term.

First, the case when only a single pivot element is used in the sorting algorithm is considered. From the equation above, the number of operations T as a function of the number of elements to be sorted n may be represented by the equation:

$$T(n)=A*n*\ln(n)+B \quad (1)$$

In a sorting algorithm that uses the divide and conquer process and only one pivot element, the non-pivot elements are first compared with the one pivot element, resulting in (n−1) operations, since there are (n−1) non-pivot elements. Next, each of the non-pivot elements is added to one of the two sub-arrays, which results in another (n−1) operations. Finally, each of the two sub-arrays are sorted recursively, resulting in two additional calls to the function T, except that the number of elements in the two sub-arrays is approximately half of the number of elements n in the best case scenario. Thus, we can represent T(n) by the equation:

$$T(n)=(n-1)+(n-1)+2*T(n/2)=2*(n-1)+2*T(n/2) \quad (2)$$

Next, the coefficients A and B can be determined using the equations (1) and (2) above. First, T(n) is substituted from equation (1) into equation (2), which yields the following equation:

$$A*n*\ln(n)+B=2*(n-1)+2(A*(n/2)*\ln(n/2)+B) \quad (3)$$

Using the properties of logarithms, equation (3) can then be reduced to:

$$A*n*\ln(n)+B=2*(n-1)+2*B+A*n*\ln(n)-A*n*\ln(2) \quad (4)$$

$$B=A*n*\ln(2)-2*(n-1) \quad (5)$$

Next, the coefficient B in equation (5) may be substituted into equation (1), which yields:

$$T(n)=A*n*\ln(n)+A*n*\ln(2)-2*(n-1) \quad (6)$$

To solve for A, we can consider the most simple case when the number of elements is equal to two (n=2). Since this case takes a maximum of two operations, we know that T(2)=2. Therefore, we can solve equation (6) using the case for n=2, which provides:

$$T(2)=2=A*2*\ln(2)+A*2*\ln(2)-2*(2-1) \quad (7)$$

which reduces approximately to:

$$A=1/\ln(2)=1.443 \quad (8)$$

Therefore, the function T(n) for the case where a single pivot element is used by the sorting algorithm may be approximated by the equation:

$$T(n)\approx 1.443*n*\ln(n) \quad (9)$$

Now, to illustrate the efficiency improvements obtained using the systems and methods of the present invention, we consider the case where two pivot elements are used, so that at each sorting level, the array is divided into three sub-arrays. Again, the number of operations T as a function of the number of elements n to be sorted may be represented as:

$$T(n)=A*n*\ln(n)+B \quad (10)$$

In this case, the two pivot elements are compared to each other, which results in one (1) operation. Then the non-pivot elements (n−2 elements) are each compared with the two pivot elements, which results in a maximum of 2*(n−2) operations. Next, the n−2 non-pivot elements are each added to one of the three sub-arrays, which adds another n−2 operations. Finally, the function T is repeated recursively for each of the three sub-arrays that are created at each sorting level, with the number of elements for each sub-array being approximately n divided by three (n/3) in the best case scenario. This yields the following equation for T(n):

$$T(n)=1+2*(n-2)+(n-2)+3*T(n/3) \quad (11)$$

Using similar steps to solve for A in the case where only one pivot element is used at each sorting level, it can be shown that for two pivot elements, the result is approximately:

$$A=5/(4*\ln(2)+2*\ln(3))=1.006 \quad (12)$$

Therefore, the number of operations T as a function of the number of elements n to be sorted can be approximated by the following equation:

$$T(n)\approx 1.006*n*\ln(n) \quad (13)$$

As shown above, the minimum number of operations required for a sorting algorithm that uses two pivot elements is significantly less than the minimum number of operations required for a sorting algorithm that uses one pivot element. This has the effect of providing a sorting algorithm that has increased efficiency over previously known systems and methods.

Using the analysis above, it can be shown that it may be desirable to use more pivot elements, depending on the number of elements to be sorted or the particular application. For example, for a large number of elements (e.g., 1000, 5000, 10000, or more), the inventors of the present invention have found that a sorting algorithm that uses 10 or more (e.g., 11, 15, or more) pivot elements may provide the optimal sorting times for a given number of elements to be sorted. Further, the advantages of the present invention may be increased as the size of the complex objects increases. As can be appreciated, the larger the size of the complex objects, the more processing time is saved by copying and swapping references to the complex objects, rather than the complex objects themselves. More specifically, the sorting algorithms of the present invention may provide more of an efficiency benefit when the complex objects to be sorted have an average size of 1 kilobyte or 1 megabyte than when the complex objects have an average size of a just a few bytes or less.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

We claim:

1. A computer implemented method for sorting an array of elements, the method comprising the steps of:
    receiving a sort request from a requesting entity that includes sorting criteria for the array of elements, wherein the elements are stored in memory that is accessible by a processor, and wherein the elements consist of references to complex objects stored in memory;
    operating the processor to run a sorting module to sort the elements from a first order to a second order differing from the first order to form a sorted array;
        wherein the elements are sorted dependent on the sorting criteria, the sorting criteria including a characteristic of the complex objects, and the sorting of the elements being performed by accessing the complex objects in the memory and by comparing the characteristics of corresponding ones of the complex objects stored in the memory; and
    storing the sorted array of elements in a memory,
    wherein the forming of the sorted array by the sorting module includes the steps of:
        selecting at least two of the elements as pivot elements; and
        sorting the elements in the array using the at least two pivot elements as initially sorted elements of the second order defining the sorted array, and
    wherein the sorting step comprises:
        comparing the pivot elements with each other to determine a sort order for the pivot elements relative to each other;
        creating a plurality of empty sub-arrays that each correspond to a sorting interval relative to the pivot elements, such that the number of sub-arrays created is one more than the number of pivots;
        determining the relative sorting position of each of the non-pivot elements in the array with respect to the pivot elements; and
        dependent upon the determining, inserting each non-pivot element of the array into a corresponding one of the plurality of sub-arrays.

2. The computer implemented method of claim 1, wherein the sorting step further comprises the step of:
    recursively performing the selecting, comparing, creating, determining, and inserting steps for each of the plurality of sub-arrays until all of the elements are in a sorted order.

3. The computer implemented method of claim 1, wherein the number of pivot elements is two or three.

4. The computer implemented method of claim 1, wherein the number of pivot elements is greater than ten.

5. The computer implemented method of claim 1, wherein the complex objects are stored in a database.

6. The computer implemented method of claim 1, wherein the selecting step includes randomly selecting elements of the array as the pivot elements.

7. The computer implemented method of claim 1, wherein the requesting entity is computer system that is operated by a user.

8. The computer implemented method of claim 7, wherein the computer system operated by the user is located remote from the computer system that includes the sorting module.

9. The computer implemented method of claim 1, wherein the number of complex objects is greater than about one thousand.

10. The computer implemented method of claim 1, wherein the average size of the complex objects is greater than about 1 kilobyte.

11. The computer implemented method of claim 1, wherein each of the references comprises only an address or location for one of the complex objects in the memory.

12. The computer implemented method of claim 1, wherein the sorting module generates the sorted array by iteratively performing the accessing of the complex objects in the memory and the comparing of the characteristics of the corresponding ones of the complex objects stored in the memory and, in response, repositioning one or more of the elements associated with the corresponding ones of the complex objects until the second order of the elements is achieved.

13. A non-transitory computer-readable storage medium having stored therein a computer program comprising code which when executed on a computer will:
   access a source array of elements, wherein each of the elements includes a reference to one of a plurality of complex objects stored in memory and wherein each of the references comprises only an address or location for one of the complex objects in the memory;
   select at least two of the elements as pivot elements;
   compare a characteristic of each of the complex objects that correspond to each of the pivot elements with each other to determine a sort order for the pivot elements relative to each other;
   create a plurality of empty sub-arrays that each correspond to a sorting interval relative to the pivot elements, such that the number of sub-arrays created is one more than the number of pivot elements;
   determine the relative sorting position of each of the non-pivot elements in the array with respect to the pivot elements by comparing the characteristic of the corresponding complex object for each of the non-pivot elements;
   dependent upon the determination, insert each non-pivot element of the array into a corresponding one of the plurality of sub-arrays; and
   recursively perform the select, compare, create, determine, and insert steps for each of the plurality of sub-arrays until all of the elements of the source array are sorted from a first order to a second order differing from the first order to form a sorted array in in a sorted order defined by a sorting criteria for the source array of elements,
   wherein the relative sorting positions of the non-pivot elements is determined by using the pivot elements as initially sorted elements of the second order defining the sorted array.

14. The computer-readable storage medium of claim 13, wherein the number of pivot elements is greater than ten.

15. The computer-readable storage medium of claim 13, wherein the complex objects are stored in a database.

16. The computer-readable storage medium of claim 13, wherein the select step includes randomly selecting elements as the pivot elements.

17. The computer-readable storage medium of claim 13, wherein the compare a characteristic step and the determine the relative sorting position step each includes accessing the complex objects in the memory, whereby the memory is recursively accessed to determine the sort order for the pivot elements and the relative sorting positions.

18. A computer system for sorting a source array that includes a plurality elements, the computer system comprising:
   a sorting algorithm module that is stored in memory of the computer system, the sorting algorithm module being operable to convert an unsorted array of elements into a sorted array of elements;
   a plurality of complex objects stored in memory of the computer system;
   an array of elements stored in memory of the computer system, wherein the each of the elements includes a reference to one of the plurality of complex objects;
   a processor that is operative to execute the sorting algorithm module; and
   memory that is operable to store the sorted array of elements;
   wherein the sorting algorithm module is operable to sort the array of elements according to sorting criteria, the sorting algorithm comprising the steps of:
      selecting at least two of the elements as pivot elements; and
      sorting the elements in the array using the at least two pivot elements to form a sorted array,
   wherein the elements are sorted dependent on the sorting criteria, the sorting criteria including a characteristic of the complex objects,
   wherein the sorting is performed by iteratively accessing the complex objects in the memory to perform a comparison of values of the characteristics, and
   wherein the sorting algorithm further comprises the steps of:
      comparing the pivot elements with each other to determine a sort order for the pivot elements relative to each other;
      creating a plurality of empty sub-arrays that each correspond to a sorting interval relative to the pivot elements, such that the number of sub-arrays created is one more than the number of pivot elements;
      determining the relative sorting position of each of the non-pivot elements in the array with respect to the pivot elements; and
      dependent upon the determining, inserting each non-pivot element of the array into a corresponding one of the plurality of sub-arrays.

19. The computer system of claim 18, wherein the sorting algorithm further comprises the step of:
   recursively performing the selecting, comparing, creating, determining, and inserting steps for each of the plurality of sub-arrays until all of the elements are in a sorted order.

20. The computer system of claim 18, further comprising:
an input interface that is operative to permit a user to request a plurality of the complex objects that are sorted according to the sorting criteria.

21. The computer system of claim 20, further comprising:
an output module that is operative to transmit a copy of the complex objects to a requesting entity in a format that is sorted according to the sorting criteria.

22. The computer system of claim 18, wherein each of the references comprises only an address or location for one of the complex objects in the memory.

\* \* \* \* \*

UNITED STATES PATENT AND TRADEMARK OFFICE
CERTIFICATE OF CORRECTION

PATENT NO.        : 9,129,004 B2
APPLICATION NO.   : 12/269170
DATED             : September 8, 2015
INVENTOR(S)       : Vladimir Yaroslavskiy, Elena Ianova and Vitaly Bychkov It is certified that error appears in the above-identified patent and that said Letters Patent is hereby corrected as shown below:

In the specification

Column 2, line 8, delete "some no and a constant c" and insert therefor --some $n_0$ and a constant c--.

Signed and Sealed this
Twenty-sixth Day of July, 2016

Michelle K. Lee
*Director of the United States Patent and Trademark Office*